(12) United States Patent
Bratton

(10) Patent No.: US 10,589,939 B2
(45) Date of Patent: Mar. 17, 2020

(54) TELESCOPIC CONVEYOR SUPPORT ASSEMBLY

(71) Applicant: Terex GB Limited, Dungannon (GB)

(72) Inventor: Terence Bratton, Sion Mills (GB)

(73) Assignee: Terex GB Limited, Dunggannon (GB)

( * ) Notice: Subject to any disclaimer, the term of this patent is extended or adjusted under 35 U.S.C. 154(b) by 0 days.

(21) Appl. No.: 15/872,576

(22) Filed: Jan. 16, 2018

(65) Prior Publication Data

US 2018/0208401 A1 Jul. 26, 2018

(30) Foreign Application Priority Data

Jan. 26, 2017 (GB) .................................. 1701335.0

(51) Int. Cl.
*B65G 21/14* (2006.01)
*F16C 13/04* (2006.01)
*F16C 41/02* (2006.01)
*B65G 41/00* (2006.01)

(52) U.S. Cl.
CPC .......... *B65G 41/003* (2013.01); *B65G 21/14* (2013.01); *F16C 13/04* (2013.01); *F16C 41/02* (2013.01); *F16C 2326/58* (2013.01)

(58) Field of Classification Search
CPC ....... B65G 21/14; B65G 41/003; F16C 13/04; F16C 41/02
USPC ............... 198/595, 812, 861.1; 384/100, 114
See application file for complete search history.

(56) References Cited

U.S. PATENT DOCUMENTS

| | | | | |
|---|---|---|---|---|
| 2,251,667 A | * | 8/1941 | Ehinger | B65G 41/002 198/318 |
| 2,701,648 A | | 2/1955 | McBath | |
| 3,799,361 A | * | 3/1974 | Rey | C21D 1/667 414/433 |
| 4,204,719 A | * | 5/1980 | Murphy | A61H 3/008 104/62 |
| 4,264,265 A | | 4/1981 | Stoychoff | |

(Continued)

FOREIGN PATENT DOCUMENTS

EP 1 314 682 A2 5/2003
EP 1 314 682 A3 5/2003

(Continued)

OTHER PUBLICATIONS

Search Report for Patent Application No. GB1701335.0 entitled "Telescopic Conveyor Support Assembly," dated Jul. 5, 2017, 1 page.

(Continued)

*Primary Examiner* — Douglas A Hess
(74) *Attorney, Agent, or Firm* — Hamilton, Brook, Smith & Reynolds, P.C.

(57) ABSTRACT

A support assembly for a telescopic conveyor may be provided. The assembly may include at least two spaced apart bearings and a reservoir of hydraulic fluid, the bearings being coupled to the reservoir to impart force to and receive force from the hydraulic fluid. The reservoir may be configured to transmit force received from any one of the bearings to at least one other of the bearings by the hydraulic fluid. The assembly can distribute uneven loads amongst the bearings thereby maintaining contact between the bearings and the conveyor, and reducing wear on the bearings and associated components.

22 Claims, 8 Drawing Sheets

(56) References Cited

U.S. PATENT DOCUMENTS

| | | | |
|---|---|---|---|
| 4,593,810 A | | 6/1986 | Cook |
| 5,348,130 A * | | 9/1994 | Thomas ............... B65G 41/008 198/303 |
| 5,899,321 A * | | 5/1999 | El-Ibiary ................ B65G 39/16 198/807 |
| 6,360,876 B1 * | | 3/2002 | Nohl .................... B65G 41/008 198/302 |
| 7,455,173 B1 * | | 11/2008 | Fridman ................ B65G 21/14 198/302 |
| 8,241,098 B1 * | | 8/2012 | Latimer .................. A01F 12/46 198/313 |
| 8,506,232 B2 * | | 8/2013 | Gallione ................... B60P 1/36 198/314 |
| 8,657,553 B1 | | 2/2014 | Rasmussen et al. |
| 8,944,239 B2 * | | 2/2015 | Campbell ............... B65G 67/08 198/588 |
| 9,840,371 B2 * | | 12/2017 | Ho ......................... B65G 21/14 |
| 10,112,775 B2 * | | 10/2018 | Hanel .................... B65G 15/08 |

FOREIGN PATENT DOCUMENTS

| | | |
|---|---|---|
| FR | 2 960 928 A1 | 12/2011 |
| GB | 2 125 004 A | 2/1984 |
| JP | S61 172220 U | 10/1986 |

OTHER PUBLICATIONS

European Search Report for International Application No. EP 18 15 0666, consisting of 2 pages, dated May 31, 2018.

\* cited by examiner

TELESCOPIC CONVEYOR SUPPORT ASSEMBLY

RELATED APPLICATION(S)

This application claims priority under 35 U.S.C. § 119 or 365 to Great Britain, Application No. 1701335.0, filed Jan. 26, 2017. The entire teachings of the above application are incorporated herein by reference.

TECHNICAL FIELD

This disclosure relates to a support assembly, in particular for a telescopic assembly, especially a telescopic conveyor.

BACKGROUND

Telescopic conveyors are commonly used to transport loose bulk materials such as aggregate from one location to another using a conveyor belt arrangement mounted upon a frame structure. Telescopic conveyors operate in such a way that they may be lowered and raised as well as being capable of forward, reverse and radial movement. This capability provides that the conveyor is able to stock piles of aggregate material uniformly upon the ground within a given area. Such conveyors are typically used in mining areas for loading mined materials into bulk carriers. Telescopic conveyors are relatively large structures, which are transported in a number of sections which are then assembled together on site. The fastening arrangement between the various sections typically comprises bolts, however using these to fasten the plurality of sections making up the base frame and/or inner frame can be cumbersome and time consuming.

A typical telescopic conveyor comprises two or more conveyor sections, which are configured to extend and retract with respect to one another in telescopic fashion. For example, a telescopic conveyor typically comprises a base frame from within which an inner frame is configured to extend out of and retract into. This movement is typically effected by a drive mechanism such as a winch and wire rope system. The inner frame when extending out of or retracting into the base frame is supported at an outer end of the base frame by a support assembly comprising one or more rollers. During such movements the inner frame, even when partially extended, can be subject to undesirable bending as a result of gravitational and environmental forces. For example, the support assembly may comprise one or more rollers which are arranged such as to facilitate movement of the inner frame relative to the base frame, whilst also supporting the inner frame during such movement.

SUMMARY

While telescopic conveyors exist, issues remain. For instance, extending/retracting movements into the inner frame of a telescopic conveyor can be supported at an outer end of the base frame by a support assembly comprising one or more rollers. During such extending or retracting movements the inner frame, even when partially extended, can be subject to undesirable bending as a result of gravitational and environmental forces. For example, the support assembly may comprise one or more rollers which are arranged such as to facilitate movement of the inner frame relative to the base frame, whilst also supporting the inner frame during such movement. However upon extension, particularly upon full extension, the inner frame may deflect or bend to a certain degree of curvature along its longitudinal axis due to the weight of the frame and/or the load being carried, this may be further compounded by environmental factors such as wind. As a result of this curvature not all of the rollers may be in contact with the inner frame when it is extended, resulting in an uneven distribution of the weight of the frame and the load it is carrying. This non-uniform distribution of weight places strain on the inner frame and reduces the operating lifetime of the frame and associated components.

Therefore, it may be desirable to provide a support assembly for a telescopic conveyor that can maintain a uniform load distribution system, which reduces wear on the conveyor frame. It may also be desirable to provide an improved drive arrangement for transitioning the telescopic conveyor between retracted and extended states.

A first example aspect of the invention provides a support assembly comprising at least two spaced apart bearings and a reservoir of hydraulic fluid, the bearings being coupled to the reservoir to impart force to and receive force from the hydraulic fluid, the reservoir being configured to transmit force received from any one of said bearings to at least one other of said bearings by said hydraulic fluid.

Preferably each bearing is movable with respect to the reservoir in a first direction in response to application of an external load to impart a corresponding force to said hydraulic fluid, and in a second direction opposite said first direction in response to receiving force from said hydraulic fluid. Said first direction is typically towards said reservoir and said second direction is away from said reservoir.

Each bearing may be supported by a respective part of the reservoir, the respective parts being hydraulically connected by the reservoir in order to transmit force, and therefore distribute load, amongst the bearings.

In some example preferred embodiments, each bearing is coupled to the reservoir by a respective hydraulic actuator. The reservoir may comprise a hydraulic circuit interconnecting the respective hydraulic actuator of each bearing with the respective hydraulic actuator of at least one other of said bearings. Said hydraulic circuit typically connects the hydraulic actuator of each bearing with the respective hydraulic actuator the or each other bearing. Each bearing may be coupled to the respective hydraulic actuator to apply a compressing force to the hydraulic actuator in response to application of an external load to the bearing. The respective hydraulic actuator is typically compressible in response to movement of the respective bearing in said first direction. The respective bearing may be movable in said second direction in response to extension of the respective hydraulic actuator.

Advantageously, said hydraulic circuit hydraulically interconnects the actuators so that hydraulic fluid can flow freely between the actuators. In some example preferred embodiments, said hydraulic circuit does not include any controllable or selectably operable fluid control devices for controlling fluid flow between the actuators. Advantageously said hydraulic circuit hydraulically interconnects said actuators to transmit force, and therefore distribute load, amongst the bearings. Each bearing may be coupled to the respective hydraulic actuator to apply a compressing force to the hydraulic actuator in response to application of an external load to the bearing. Each bearing may be movable with respect to the reservoir in a first direction in response to application of an external load, the respective hydraulic actuator being compressible in response to movement of the respective bearing in said first direction. Each bearing may be movable in a second direction in response to receiving force from said hydraulic fluid, the respective bearing being movable in said second direction in response to extension of the respective hydraulic actuator. Each hydraulic actuator typically includes a hydraulic fluid chamber that provides part of said reservoir. Preferably, each of said hydraulic actuators is a single-acting hydraulic actuator.

In alternative embodiments said reservoir comprises a flexible container containing said hydraulic fluid. Each bearing may be coupled to said flexible container and is movable to apply a compressing force to the flexible container in response to application of an external load to the bearing. Each bearing is typically movable in said first direction to deform said flexible container. Each bearing is typically movable in said second direction by deformation of said flexible container. Preferably the bearings are supported on said flexible container by a movable platform. The platform may be coupled to said flexible container for tilting movement about one or more axis. Typically said flexible container is located in a housing. Optionally retaining means are provided to couple said platform to said housing.

From another aspect, the invention provides a support assembly comprising at least two bearings supported by a rocking device in engagement with a base and being rockable back and forth in at least one axial direction with respect to the base. The rocking device typically has a convex rocking surface in engagement with a bearing surface of the base. Said bearing surface may be curved to match the curvature of the rocking surface. Said bearing surface may be provided in a recess formed in the base. Preferably, said rocking surface is spherical dome shaped.

Preferably, said at least two bearings comprise at least two bearings spaced apart in a first axial direction. Said at least two bearings may comprise at least two bearings spaced apart in a second axial direction perpendicular to said first axial direction. Said at least two bearings may comprise at least two bearings spaced apart in said first direction and said second direction.

In preferred embodiments, said at least two bearings are rotatable bearings, for example a roller or wheel.

A further aspect of the invention provides a telescopic assembly comprising a base structure, a second structure telescopically coupled to said base structure, and at least one support assembly according to other aspects of the invention supporting said second structure with respect to said base structure. Typically said at least one support assembly is located between said base structure and said second structure. Preferably at least one of said at least one support assembly is located beneath said second structure to support said second structure on said base structure. Optionally at least one of said at least one support assembly is located above said second structure. Said at least one support assembly may include a plurality of said support assemblies spaced apart in the direction of telescopic extension. In some embodiments said telescopic assembly is a telescopic conveyor.

Further example advantageous aspects of the invention will become apparent to those ordinarily skilled in the art upon the following description of specific embodiments and with reference to the accompanying drawings.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Embodiments of the invention will now be described with reference to the accompanying drawings, by way of example only, in which like numerals are used to denote like parts and in which.

DETAILED DESCRIPTION

A description of example embodiments follows.

Figure 1:
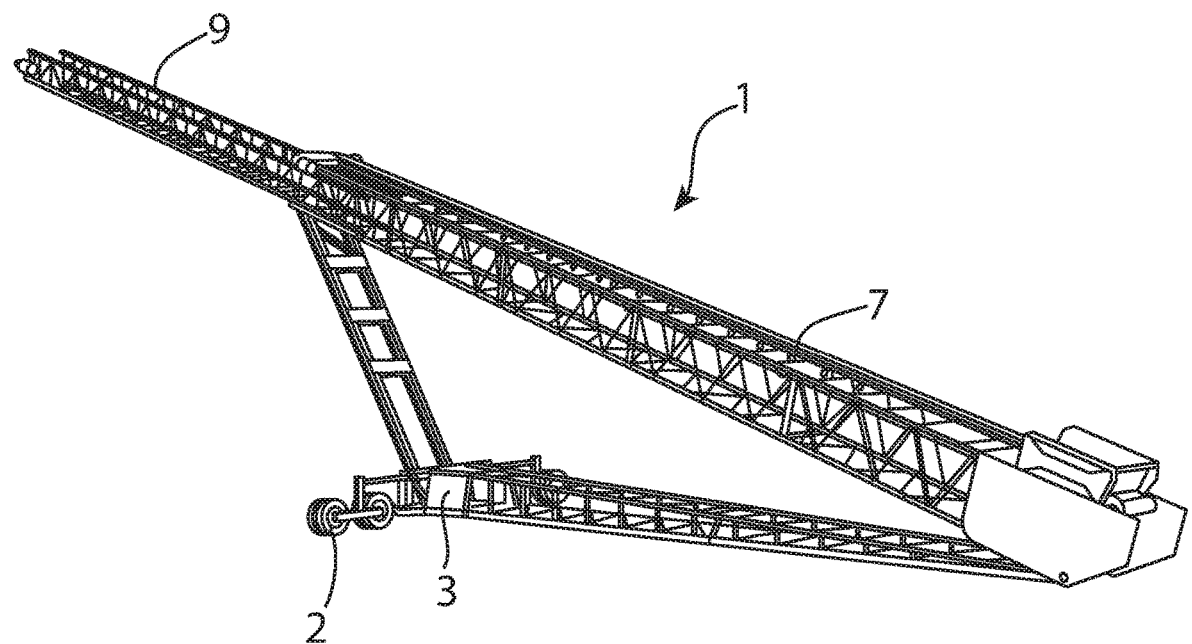
FIG. 1 is a perspective view of a telescopic conveyor.

Referring now to the drawings there is shown, generally indicated by reference numeral 1 a telescopic conveyor comprising a support assembly 4, the support assembly 4 embodying a first aspect of the invention. The telescopic conveyor 1 is configured to receive, carry and displace aggregate or other material and to this end the conveyor 1 includes one or more belt conveyors (not shown). Typically, the telescopic conveyor 1 is mobile and comprises one or more wheels 2 and/or tracks mounted on a chassis 3 as shown in FIG. 1. The apparatus 1 is usually towable, it is usually provided with wheels 2 for this purpose.

It should be understood that for reasons of clarity, in FIGS. 1 to 8, only those elements of the conveyer 1 necessary for understanding the invention have been shown. Furthermore in the following description, it is assumed that the term "vertical" is intended to mean perpendicular to the surface on which the telescopic conveyor 1 is located in use. The telescopic conveyor 1 comprises an outer base frame 7 which is shaped and dimensioned to receive a second, inner frame 9. The inner frame 9 is telescopically mounted within the base frame 7 such that the inner frame 9 is moveable with respect to the base frame 7 between an extended state and a retracted state and a plurality of intermediary extended/retracted states therebetween. The inner frame 9 extends from the base frame 7 in cantilever fashion in-use. It will be apparent that there are other ways in which first and second frames can be telescopically arranged. In use, the frames carry one or more conveyor belts and associated components, e.g. conveyor rollers and drive mechanisms. These may be provided in any convenient conventional manner and are not shown for reasons of clarity.

The conveyor 1 includes a drive mechanism (not shown) for moving the inner frame 9 with respect to the base frame 7. The drive mechanism may be provided on the base frame 7 and may comprise a winch and rope arrangement or any other suitable drive means. The inner frame 9 has smaller dimensions than the base frame 7 such that the inner frame 9 can be received within the base frame 7. Both the base frame 7 and inner frame 9 may comprise a hollow lattice of interconnected support members, which are typically arranged such that the base frame 7 and inner frame 9 have a substantially rectangular or square cross section. The term "forward" as used herein is to be understood as the direction in which the inner frame 9 extends out of the base frame 7, with the term "rearward" being the opposing direction to "forward".

The inner frame 9 is supported by the base frame 7 by a first support assembly 4. The first support assembly 4 is located at a relatively forward position on the base frame, typically at the forward end of the base frame. The first support assembly 4 may be mounted on an interior surface of the base frame 7 such that it contacts the underside of the inner frame 9, i.e. it supports the inner frame from its underside. The support assembly 4 comprises a plurality of bearings 10 which facilitate movement of the inner frame 9 relative to the base frame 7. In preferred embodiments each bearing 10 comprises a rotatable bearing, e.g. a roller, ball or wheel, but alternatively any other suitable bearing (rotatable or non-rotatable (e.g. part of a slide bearing)) may be used. The bearing 10 is carried by a support 13, which in preferred embodiments includes a coupling 12, e.g. comprising an axle (not shown) mounted between axle supports, for rotatably coupling the bearing 10 to the support 13.

The bearings 10 are supported by a hydraulic load distribution apparatus 14. The load distribution apparatus 14 comprises a reservoir 15 containing hydraulic fluid, for example oil or grease, the bearings 10 being supported in use by the fluid in the reservoir 15. The apparatus 14 includes means for supporting each bearing 10 at a respective spaced apart location.

The bearings 10 are coupled to the reservoir 15 to impart force to and receive force from the hydraulic fluid. The reservoir transmits force received from any one of the bearings 10 to at least one other of the bearings 10 by the hydraulic fluid. To this end each bearing 10 is supported by a respective part of the reservoir 15, the respective parts being hydraulically connected via the structure of the reservoir 15 in order to transmit force, and therefore distribute load, amongst the bearings 10.

Each bearing 10 is movable with respect to the reservoir 15 in a first direction (typically towards the part of the reservoir that supports it) in response to application of an external load to impart a corresponding force to the hydraulic fluid, and in a second direction (typically away from the part of the reservoir that supports it) opposite the first direction in response to receiving force from the hydraulic fluid. This movement is facilitated by the coupling between the bearings and the reservoir.

Figure 2:
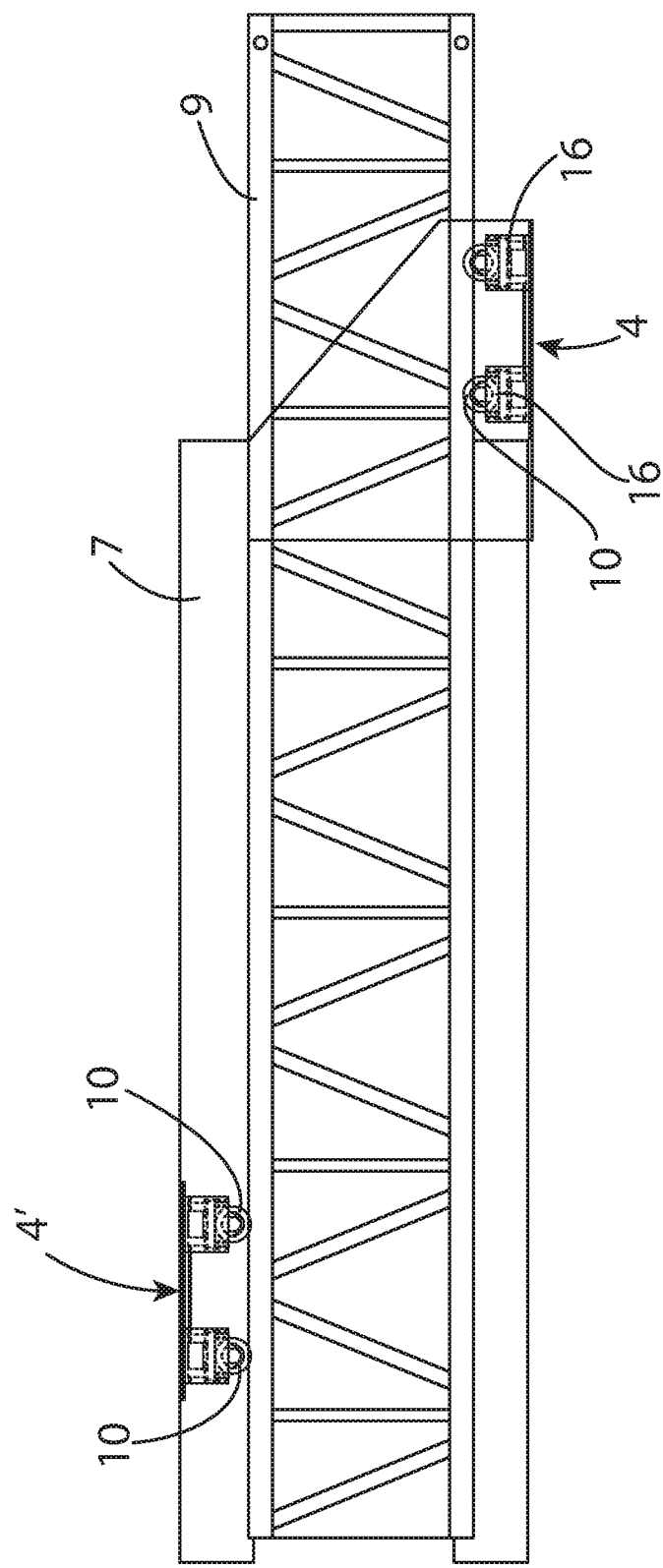
FIG. 2 is a side view of a telescopic conveyor comprising a base frame and an inner frame which has a support assembly embodying a first aspect of the invention provided on the base frame.
Figure 3:
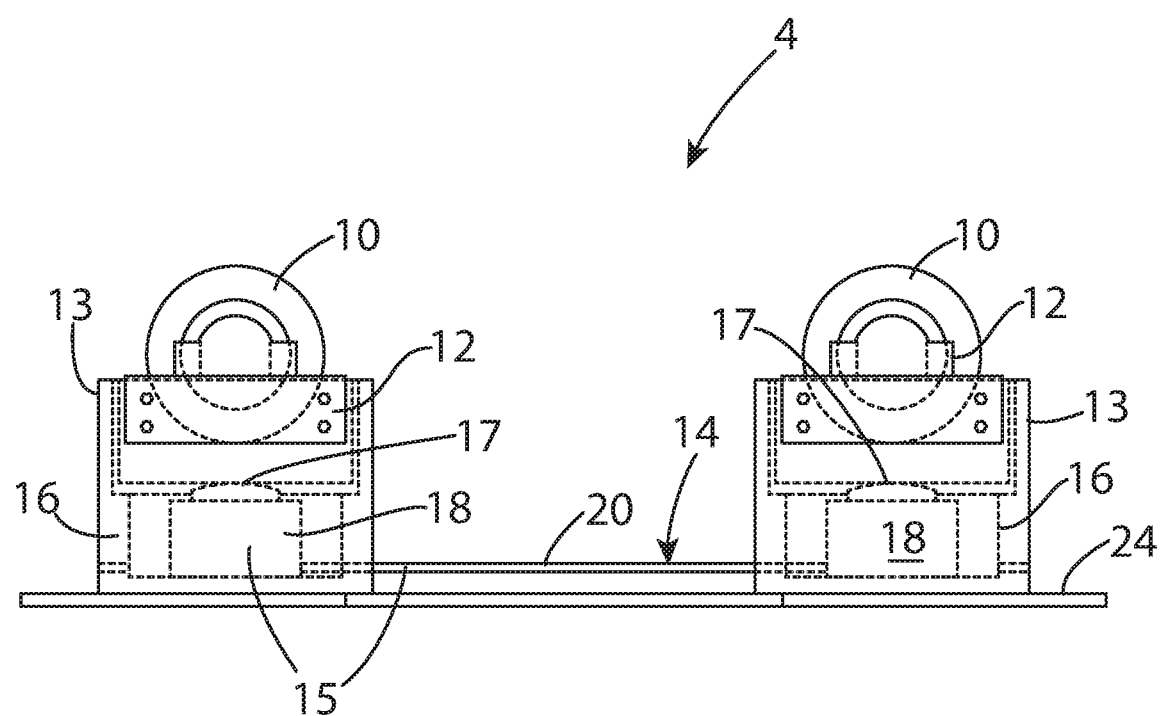
FIG. 3 is a side view of the support assembly.
Figure 4:
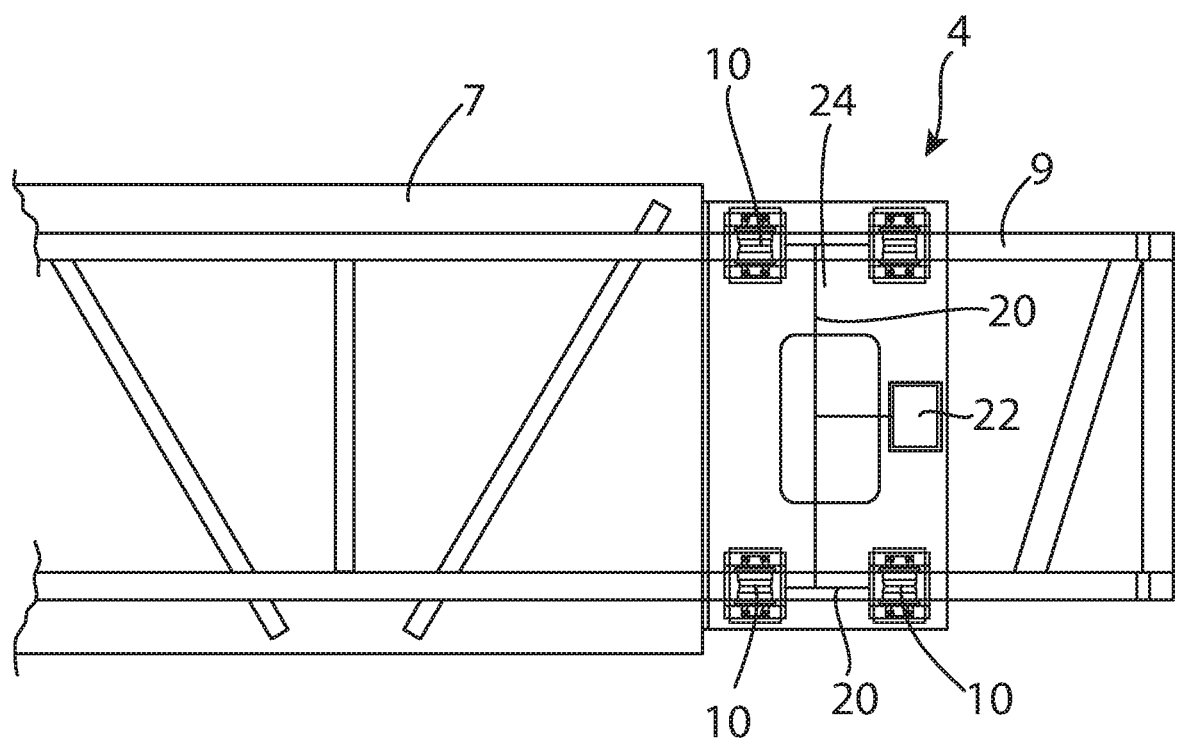
FIG. 4 is a top plan view of the support assembly mounted on the conveyor.

In the embodiment shown in FIGS. 2 to 4, each bearing 10 is coupled to the reservoir 15 by a respective hydraulic actuator 16 (commonly referred to as a hydraulic cylinder), in particular a linear hydraulic actuator, for each bearing 10. In preferred embodiments, the actuators 16 are single-acting hydraulic actuators (commonly referred to as single-acting hydraulic cylinders). By way of example, the RSM-series or RCS-series Flat-Jac (Trade Mark) hydraulic cylinders provided by Enerpac of Wisconsin USA are suitable for use as the actuators 16. Each actuator 16 is hydraulically connected to at least one other, and preferably each other, actuator 16 via the reservoir 15. The respective bearing 10 is supported directly or indirectly by the respective actuator 16 such that, in use, the load imparted to the bearing 10 by the inner frame 9 is transmitted to the respective actuator 16 and therefore to the hydraulic fluid in the reservoir 15. In the illustrated embodiment, each actuator 16 is housed in the respective support 13, but may otherwise serve as the, or part of the, respective support 13. In any event each bearing 10 is supported on a respective part of the reservoir 15 via the respective actuator 16.

Each actuator 16 comprises a piston chamber 18 (which may be referred to as the cylinder, barrel or fluid chamber) which houses a piston (not shown) and contains hydraulic fluid for acting on, and being acted upon by, the piston. Each actuator 16 includes an external coupling part 17 (which may be referred to as a piston rod or plunger), which is connected to, or part of, the piston so that can be moved by, or move, the piston in use.

The respective piston chamber 18 of each actuator 16 is hydraulically connected to the piston chamber 18 of the, or each, other actuator 16 to which it is hydraulically connected, typically by one or more hydraulic line 20. The preferred arrangement is such that fluid can flow freely between the inter-connected actuators 16, e.g. no valves for restricting or preventing the flow of fluid between the actuators. Typically, a hydraulic accumulator 22 is connected to the reservoir 15 to maintain hydraulic pressure in the circuit and supply hydraulic fluid to the reservoir if and when needed, e.g. to compensate for leakage. As can be seen from FIG. 4, the actuators 16 are hydraulically interconnected by a hydraulic circuit comprising hydraulic line(s) 20. The accumulator 22, when present, is also connected to the hydraulic circuit. The reservoir 15 therefore comprises the actuators 16 (more particularly the piston chambers 18 that contain its hydraulic fluid) and the hydraulic circuit that interconnects them. In this embodiment, the supporting parts of the reservoir 15 are the respective piston chambers 18.

Figure 9:
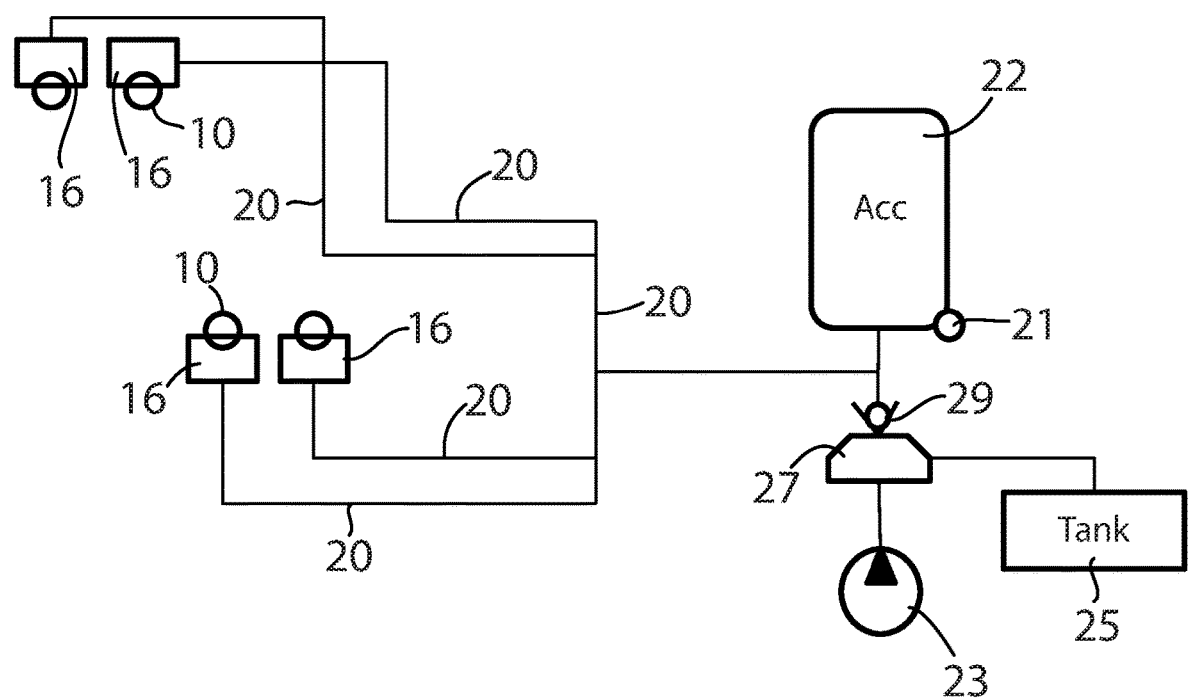
FIG. 9 is a schematic view of a hydraulic circuit suitable for use with the support assembly of FIGS. 2 to 4.

FIG. 9 shows an example of a hydraulic circuit that is suitable for hydraulically inter-connecting the respective piston chambers 18 of actuators 16. The circuit comprises hydraulic lines 20 that hydraulically interconnect the actuators 16 so that hydraulic fluid can flow freely between the actuators 16, via the lines 20. To this end, the circuit does not include any fluid control devices that need to be controlled or operated to allow fluid flow between the actuators 16. For example, the circuit does not include any valves, or other fluid control devices, for preventing or otherwise controlling the flow of fluid between the actuators 16. The result is that there is, in use, even load distribution between the actuators 16, and therefore the bearings 10, by means of the common hydraulic circuit. It is preferred that the lines of the hydraulic circuit have the same bore profile, typically the same uniform bore. The actuators 16 may be connected in parallel by the hydraulic circuit.

The accumulator 22, when present, is connected to the hydraulic circuit. Typically, a pump 23 is connected, or connectable, to the hydraulic circuit, and is operable to charge the circuit, typically via the accumulator 22, with hydraulic fluid from a tank 25 when required. In this example, the pump 23 and tank 25 are connected to the hydraulic circuit by a control block 27, which typically includes a valve 29, e.g. a non-return valve. In use, the pump 23 charges the accumulator 22 with hydraulic fluid, and when the accumulator 22 is fully charged value 29 closes to prevent further fluid entering the circuit from the tank 25. The hydraulic pressure in the circuit then balances evenly between the actuators 16 by means of the common hydraulic circuit. A sensor 21 is provided (e.g. at the accumulator 22 but optionally elsewhere in the hydraulic circuit) for monitoring hydraulic pressure in the hydraulic circuit. In response to the sensor 21 detecting an actionable decrease in fluid pressure (e.g. below an absolute threshold level and/or by a threshold amount) the pump 23 operates to supply hydraulic fluid to the accumulator 22 from the tank 25 to re-charge the accumulator 22 and so to re-establish the desired pressure in the circuit.

The bearing 10 is coupled to the respective actuator 16 in any convenient manner, for example by being in direct engagement with, e.g. resting on, the actuator 16. In preferred embodiments the engagement must allow the bearing 10 to rotate. In the illustrated embodiment, the bearing 10 engages with the coupling part 17 of the actuator 16. The bearing 10 engages with a flat surface of the coupling part 17 of the actuator 16 in this example although the engagement surface may alternatively be curved, e.g. saddle-shaped. In any event, in response to an external load applied to the bearing 10 (by the frame 9 in this case) the bearing is movable downwardly (as viewed in FIG. 3) to compress its actuator 16 thereby transmitting the load to the hydraulic fluid. In response to a force being applied to the actuator 16 by the hydraulic fluid, the actuator 16 may be extended to lift its bearing 10 upwards (as viewed in FIG. 3). The extent to which each actuator 16 may extend or compress, and therefore the extent to which each bearing 10 may move up or down, depends on the distribution of the load applied to the support assembly 4 by the frame 9.

In order to distribute load in a longitudinal direction (i.e. the forward and rearward direction corresponding to the longitudinal axis of the frames 7, 9) the support assembly 4 includes at least two bearings 10 spaced apart in the longitudinal direction and supported by hydraulically interconnected supports as described above. In order to distribute load in a transverse direction (i.e. laterally of the frames 7, 9 in a direction perpendicular to the longitudinal axis) the support assembly 4 includes at least two bearings 10 spaced apart in the transverse direction and supported hydraulically interconnected supports as described above. In the illustrated embodiment, both longitudinal and transverse load distribution is achieved by providing first and second sets of two (or more) bearings 10, the bearings in each set being longitudinally spaced apart but in line transversely, and the sets being transversely spaced apart but longitudinally in line, e.g. four bearings arranged rectangularly, Each bearing 10 is supported in this example by the respective hydraulic actuator 16, and all of the actuators 16 are preferably hydraulically interconnected with each other. Conveniently at least one bearing 10 is aligned with each side of the inner frame 9. In the illustrated embodiment, a respective set of bearings 10 is provided at each side of the inner frame 9.

In alternative embodiments (not illustrated) more or fewer bearings and associated hydraulic supports may be provided. Typically, there are at least two bearings 10, which are laterally and/or longitudinally spaced apart supported by interconnected hydraulic supports to provide lateral and/or longitudinal load distribution. It is preferred to provide both lateral and longitudinal load distribution. However some embodiments may provide longitudinal-only or lateral-only load distribution. It will be apparent that this is determined by the relative spacing of the bearings 10 and their hydraulic interconnection. For example, two bearings that are spaced apart both laterally and longitudinally and which have hydraulically interconnected supports can provide both lateral and longitudinal load distribution. However, the support assembly 4 may provide only longitudinal load distribution if only longitudinally spaced bearings 10 are hydraulically linked, or only lateral load distribution if only laterally spaced bearings are hydraulically linked.

In typical embodiments, a set of at least one, and preferably at least two, bearings is provided at each side of the inner frame 9. In any event it is preferred that all of the provided bearings 10 are hydraulically interlinked by the respective support means.

The support assembly 4 is conveniently provided on a base 24, preferably having a flat surface on which the actuators 16 are mounted. The preferred arrangement is that the bearings 10 (or more particularly the surface of the bearings that engage with the frame 9), in the absence of any load, lie in a common plane. The base 24 may be fixed to the base frame 7.

In use, if the bearings 10 are non-equally loaded by the inner frame 9 the hydraulic actuators 16 are correspondingly non-equally loaded. As a result, the hydraulic fluid in the reservoir 15 flows between the hydraulically interconnected actuators 16 until a load balancing state is achieved. In the load balancing state the excess load experienced as a compressing force by the relatively highly-loaded actuator(s) is transmitted by the hydraulic fluid to the relatively lowly-loaded actuator(s) as an extending force. This may result in by the relatively highly-loaded actuator(s) adopting a relatively compressed state and the relatively lowly-loaded actuator(s) adopting a relatively extended state. In any event, the excess load is distributed to the relatively lowly-loaded actuator(s). The load distribution serves to maintain contact between the inner frame 7 and all of the bearings 10 and reduces wear on the bearings and associated components that may otherwise result from non-even loading. This is particularly advantageous when the conveyor 1 is in the extended state or a partially extended state and where a carried payload or environmental factor has caused the load to be unevenly applied to the bearings 10 by the frame 7. For example, the extendable inner frame 9 when extended may deflects to a certain degree of curvature along its longitudinal axis and may also tilt to a certain angle horizontally due to movement of telescopic conveyor 1 over uneven ground. However the action of the support assembly causes all of the bearings to be in contact with the inner frame and to equally distribute load due to compression and extension of the hydraulic actuators. Hence the support assembly allows to and fro travel of extendable inner frame 8 with uniform distribution of load to the base frame 7 throughout the movement.

One or more additional support assemblies 4 may be located upon the base frame 7, preferably spaced apart from the first support assembly in the longitudinal direction, preferably rearwardly. Advantageously, at least one additional support assembly 4 is provided on the base frame 7 to support the inner frame 7 from above, i.e. such that it engages with the upper side of the inner frame 9. In the preferred embodiment a second support assembly 4' is provided rearwardly of the first support assembly 4 and is positioned to engage with the inner frame 9 from above.

Figure 5:
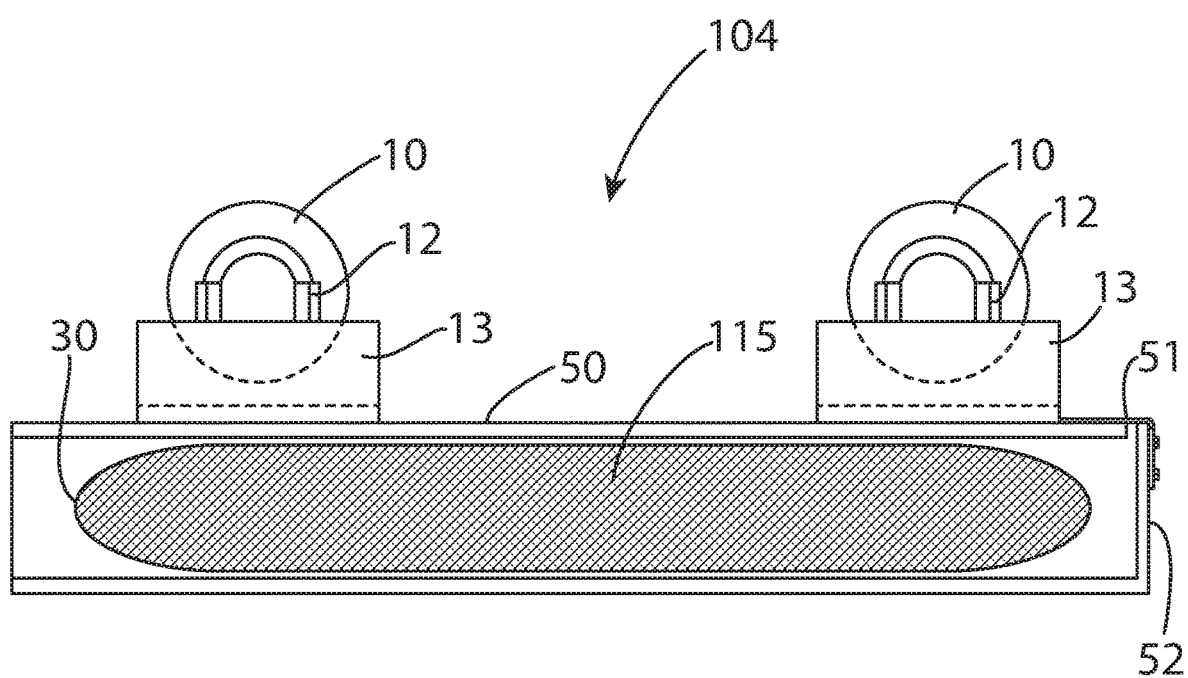
FIG. 5 is a side view of a first alternative embodiment of the support assembly.

FIG. 5 shows an alternative embodiment of the support assembly 104, which may be installed between the inner and outer frames 9, 7. In this embodiment, the hydraulic reservoir 115 comprises a closed flexible container 30, for example a bag or balloon, for containing the hydraulic fluid, e.g. oil, grease or even a particulate fluid. The bearings 10 are supported on the container 30 by a movable platform 50 located between the bearings 10 and the container 30. The bearings 10 are fixed with respect to the platform 50 at spaced apart locations. The number and spacing of the bearings 10 may vary to suit the application in the same manner as described above. For example, four rectangularly spaced bearings may be provided. In the illustrated embodiment the bearings 10 are carried by a respective support 13, in the same or similar manner to that described above, the supports 13 being fixed to the platform 50 in any convenient manner. The platform 50, which conveniently takes the form of a plate, has a flat surface for receiving the bearings/supports. The platform 50 may be fixed to the container 30 (by any convenient fixing means) or may rest on it. In any event the platform 50 is movable, in particular by tilting, depending on the shape of the container 30. When a load is applied to any one of the bearings 10, the force is applied, through the support 13 and the platform 50, to the container 30. If an uneven load is applied across the bearings 10, i.e. if one or more of the bearings are more heavily loaded than one or more others, the container 30 deforms causing the platform 50 to tilt. In preferred embodiments the platform 50 is free to tilt about any axis lying in a plane perpendicular to the direction of application of the load (which is assumed to be vertically downwards as viewed in the drawings), and may tilt about any one or more of these axes depending on any imbalance in the loads experienced by the respective bearings 4. Optionally, the platform 50 may be restricted so that it may tilt about only one or more selected axis. This may be achieved by, for example, pivotably mounting the platform 50 on one or more suitable supports.

In any event, when the bearings 10 are unevenly loaded, the (or each) relatively highly loaded bearing 10 moves towards the container 30 causing the container to deform. Deformation of the container 30 changes the distribution of the hydraulic fluid in the container 30. In particular the quantity of fluid beneath the relatively lowly-loaded bearing(s) 10 increases with the result that the relatively lowly-loaded bearing(s) 10 move upwardly, i.e. in a direction away from the container 30. The distribution of fluid in the container 30 continues until a load balancing state is achieved. In the load balancing state the excess load experienced as a depressing force by the relatively highly-loaded actuator(s) is transmitted by the hydraulic fluid to the relatively lowly-loaded actuator(s) as a lifting force. As such the excess load is distributed to the relatively lowly-loaded actuator(s). The load distribution serves to maintain contact between the inner frame 7 and all of the bearings 10 and reduces wear on the bearings and associated components that may otherwise result from non-even loading. In preferred embodiments the bearings are spaced apart in two perpendicular directions to facilitate load distribution in both the longitudinal and transverse directions.

In the illustrated embodiment the container 30 is located in a housing 52 which may be mounted on the outer frame 7 at a desired location. The platform 50 may or may not be coupled to the housing 52 as desired. For example in the illustrated embodiment the platform 50 is not connected to the housing 52 and so is able to tilt about any axis. Alternatively, the platform 50 may be pivotably coupled to the housing 52 for pivoting/tiling about one or more defined axis. Alternatively, or in addition, one or more retainer lips 51 may be provided around the mouth of housing 52 to prevent the platform 50 from becoming removed from the housing 52.

More than one support assembly 104 may be provided in the same manner described for the support assembly 104. In alternative embodiments the bearings 10 may be individually mounted on or otherwise coupled to the container 30, e.g. by a respective separate platform or no platform at all, or more than one platform may be provided, each platform carrying at least two bearings.

It will be apparent from the foregoing that the support assemblies 4, 104 are suited for location between the outer and inner frames 7, 9 of the telescopic conveyor 1 to distribute uneven loads that may from time to time be exerted in the assemblies 4, 104 by the inner frame 9 amongst the bearings 10. The hydraulic fluid in the reservoir 15, 115 allows self-alignment of the bearings 10 with the inner frame 9 and causes equal distribution of load over the support assembly 4, 104 as applied by the extendable inner frame 9, particularly when it tends to deflect or tilt to a certain extent. Hence the support assembly allows travel of the frame 9 with uniform distribution of load to all bearings.

It will be appreciated however that support assemblies embodying the invention are not limited to use with telescopic conveyors and may be used to distribute loads in other applications, particularly telescopic assemblies. Embodiments of the invention are particularly suited for use in supporting a structure that is telescopically mounted on a base structure, for example a telescopically extendable boom arm, or more generally a structure that is mounted on linearly extendible with respect to a base structure.

Figure 6A:
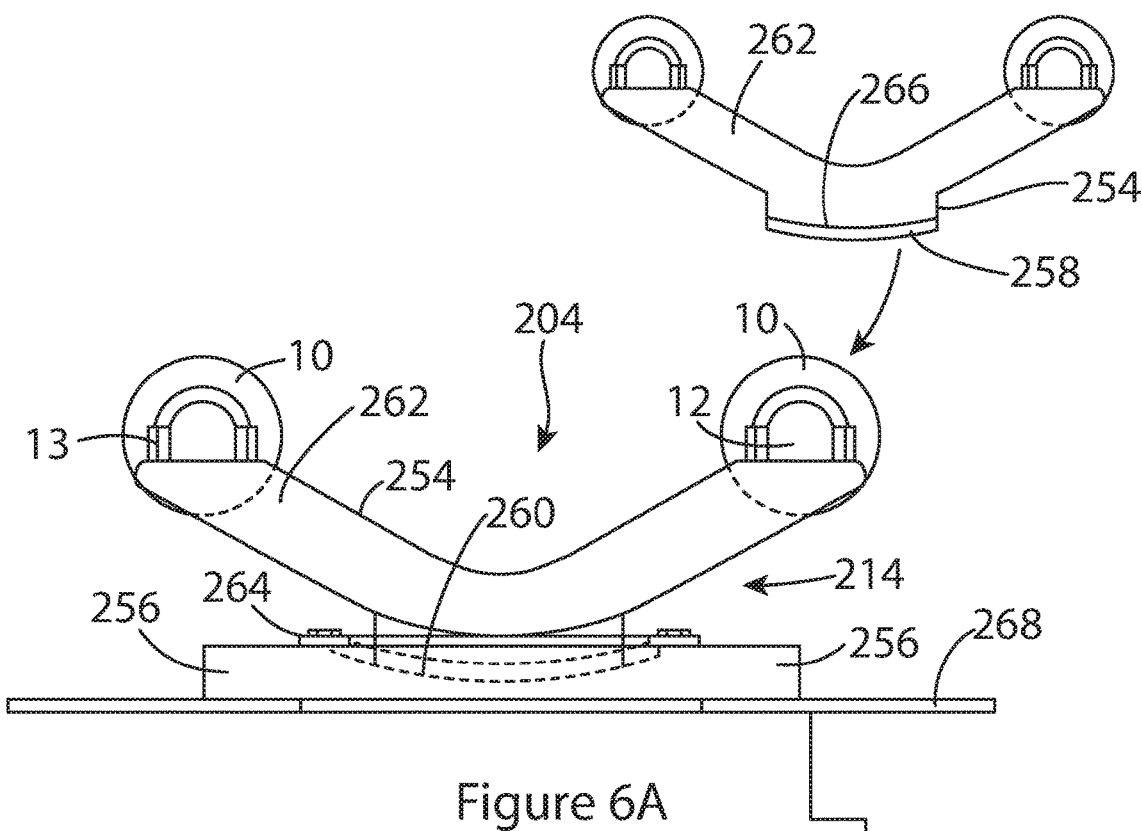
FIG. 6A is a side view of the second alternative embodiment of the support assembly.
Figure 6:
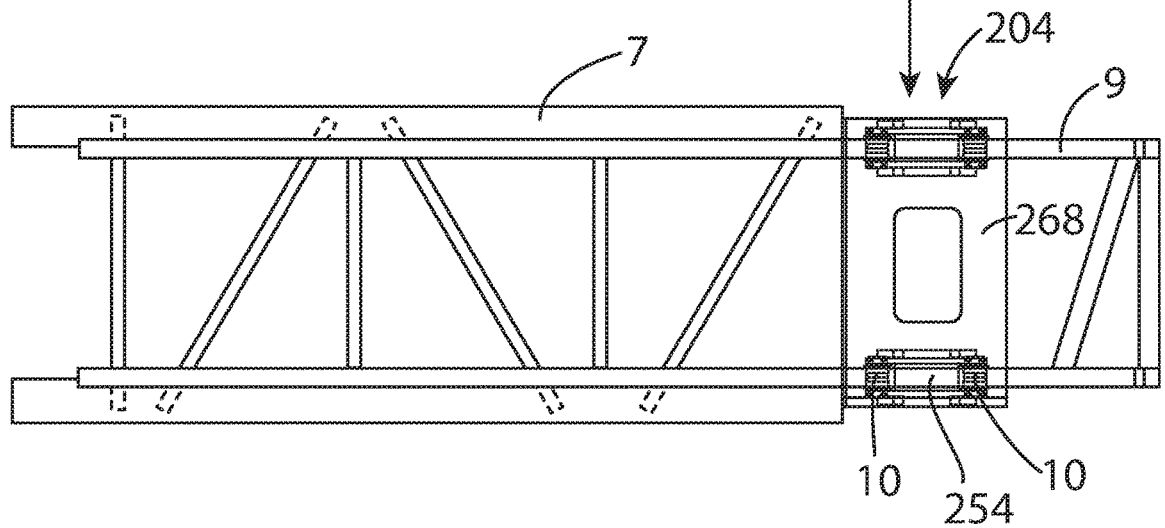
FIG. 6 is a top plan view of a second alternative embodiment of the support assembly shown on the conveyor.
Figure 7:
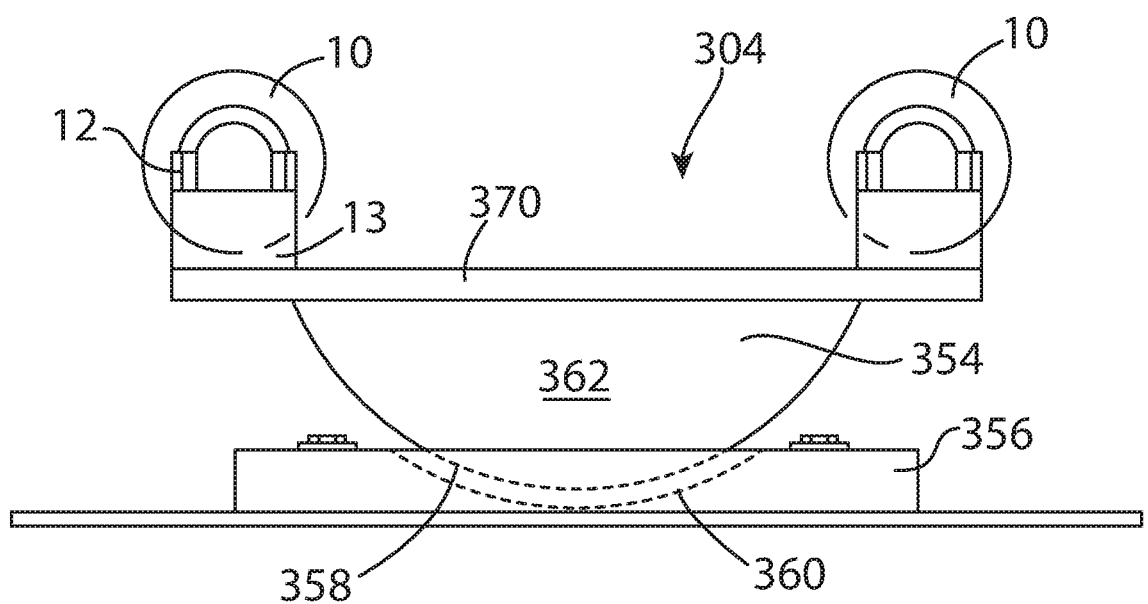
FIG. 7 is a side view of a third alternative embodiment of the support assembly.
Figure 8:
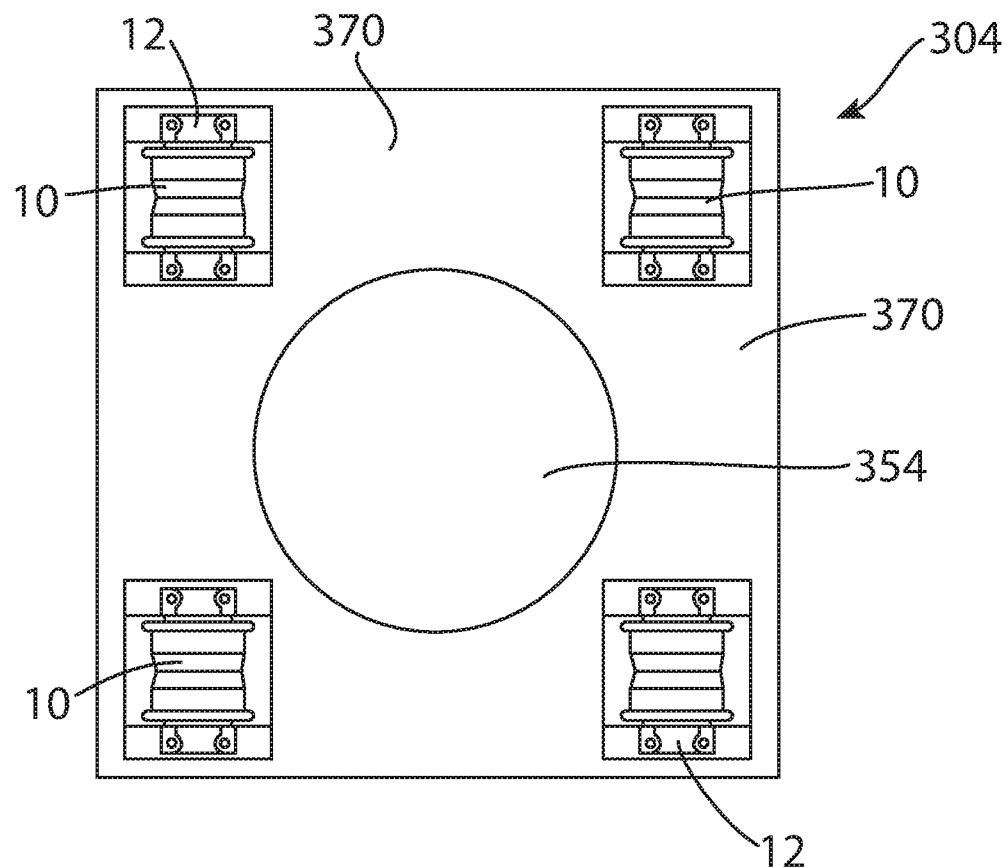
FIG. 8 is a top plan view of the third alternative embodiment of the support assembly.

Referring now to FIGS. 6 to 8, alternative support assemblies 204, 304 are described. The support assemblies include a plurality of bearings 10 supported by a load distribution apparatus 214, 314. However, unlike the load distribution apparatus 14 of FIGS. 3 to 5, does not include a hydraulic reservoir. Instead the load distribution apparatus 214, 314 comprises a rocking device 254, 354 in engagement with a base 256, 356 and being rockable back and forth in at least one axial direction with respect to the base 256, 356. The rocking device 254, 354 has a convex rocking surface 258, 358, which is preferably coated with a non-metallic bearing material, in engagement with a bearing surface 260, 360 of the base 256, 356, which may be curved (advantageously concave), e.g. to match the curvature of the rocking surface 258, 358, or flat. At least two bearings 10 are coupled to the rocking device 254, 354 and are rocked back and forth by the rocking action of the rocking device 254, 354.

In the embodiment of FIGS. 6 and 6A, the rocking device 254 comprises a body 262 that includes the rocking surface 258, the rocking surface 258 being curved along one axis only so that it supports rocking back and forth in one direction (left to right as viewed in FIGS. 6 and 6A). In this example the body 262 comprises a curved arm, a respective bearing 10 being coupled to either end of the arm and the rocking surface 258 being formed on an outer side of the apex of the arm between the ends. Each bearing 10 may be carried by a respective support 13, in the same or similar manner to that described above, the supports 13 being coupled to or part of the body as is convenient. The bearing surface 260 is concave and preferably has a curvature to match the curvature of the rocking surface 258. In the illustrated example, the curved bearing surface 260 is formed as a recess in the base 256, e.g. as a slot with a curved base. The rocking device 254 may be held in engagement with the base 256 by the weight of the inner frame 9 (or other load). However, a retaining mechanism may be provided to hold the rocking device 254 in engagement with the base 256. In the illustrated example, the retaining mechanism comprises a cover 264 extending partly across the recess and being engagable with the body 262 to prevent the rocking device 254 from being removed from the base 256. In this example the body 262 has a lateral projection 266 on either side for engaging with the cover 264.

FIG. 6 shows two instances of the support assembly 204 installed on the conveyor 1. The support assemblies 204 are spaced apart in the transverse direction, preferably such that one is aligned with each side of the inner frame 9 and located under the frame to provide support from beneath. The support assemblies 204 are positioned with their rocking direction is aligned with the longitudinal axis of the conveyor 1. Each assembly 204 provides load distribution in one direction only, in this case along the longitudinal axis of the conveyor 1. Alternatively the or each support assembly 204 may be aligned with the transverse axis of the conveyor 1 to provide load distribution in the transverse direction. The support apparatus 204 may be carried by a platform 268 or other support structure which may be mounted on the outer frame 7 at a desired location. Conveniently each instance of the support assembly 204 may be mounted on the same support structure 268.

In the embodiment of FIGS. 7 and 8, the rocking device 354 comprises a body 362 that includes the rocking surface 358, the rocking surface 358 being curved along at least two perpendicular axes so that it supports rocking back and forth in at least two perpendicular directions (left to right, and away from and toward the viewer as viewed in FIGS. 7 and 8). In this example the body 362 is shaped as a spherical dome and provides a spherical dome-shaped rocking surface 358. The bearing surface 360 is concave and preferably has a domed curvature to match the curvature of the rocking surface 358. In the illustrated example, the curved bearing surface 360 is formed as a dome shaped recess in the base 356.

The rocking device 354 may be held in engagement with the base 356 by the weight of the inner frame 9 (or other load). However, a retaining mechanism (not shown) may be provided to hold the rocking device 354 in engagement with the base 356.

The bearings 10 are coupled to the body 362 in a spaced apart arrangement. In this example the bearings 10 are mounted on a platform 370 that is carried by or part of the body 362. The platform 370 preferably provides a flat surface for receiving the bearings 10. Each bearing 10 may be carried by a respective support 13, in the same or similar manner to that described above, the supports 13 being fixed to the platform 370 in any convenient manner. The number and spacing of the bearings 10 may vary to suit the application in the same manner as described above in relation to FIGS. 3 and 4. In preferred embodiments the bearings are spaced apart in two perpendicular directions to facilitate load distribution in both the longitudinal and transverse directions. For example, four rectangularly spaced bearings may be provided.

One or more instances of the support assembly 204, 304 may be installed on a telescopic conveyor 1 in the same or similar manner to that described above in relation to the other disclosed support assemblies 4, 104.

In use, when uneven load is applied to the support assembly 204, 304 causing the bearings 10 to be unevenly loaded, the (or each) relatively highly loaded bearing 10 moves towards the base 256, 356 causing the rocking device 254, 354 to rock. Downward movement of one or more bearing 10 causes a corresponding upward movement (i.e. away from the base 256, 356) of one or more other bearing 10 by means of the rocking movement. The rocking movement continues until a load balancing state is achieved. In the load balancing state the excess load experienced as a depressing force by the relatively highly-loaded actuator(s) is transmitted by the rocking device to the relatively lowly-loaded actuator(s) as a lifting force. As such the excess load is distributed to the relatively lowly-loaded actuator(s). The load distribution serves to maintain contact between the inner frame 7 and all of the bearings 10 and reduces wear on the bearings and associated components that may otherwise result from non-even loading.

The teachings of all patents, published applications and references cited herein are incorporated by reference in their entirety.

The invention is not limited to the embodiment(s) described herein but can be amended or modified without departing from the scope of the present invention.

While example embodiments have been particularly shown and described, it will be understood by those skilled in the art that various changes in form and details may be made therein without departing from the scope of the embodiments encompassed by the appended claims.

What is claimed is:

1. A support assembly comprising at least two spaced apart bearings and a reservoir of hydraulic fluid, the bearings being coupled to the reservoir to impart force to and receive force from the hydraulic fluid, the reservoir being configured to transmit force received from any one of said bearings to at least one other of said bearings by said hydraulic fluid, wherein each bearing is coupled to the reservoir by a respective hydraulic actuator, wherein the reservoir comprises a hydraulic circuit interconnecting the respective hydraulic actuator of each bearing with the respective hydraulic actuator of the, or each, other bearing such that hydraulic fluid can flow freely between the actuators.

2. The support assembly of claim 1 wherein said hydraulic circuit does not include any controllable or selectably operable fluid control devices for controlling fluid flow between the actuators.

3. The support assembly of claim 1, wherein said hydraulic circuit hydraulically interconnects said actuators to transmit force, and therefore distribute load, amongst the bearings.

4. The support assembly of claim 1, wherein each bearing is coupled to the respective hydraulic actuator to apply a compressing force to the hydraulic actuator in response to application of an external load to the bearing.

5. The support assembly of claim 1, wherein each bearing is movable with respect to the reservoir in a first direction in response to application of an external load, the respective hydraulic actuator being compressible in response to movement of the respective bearing in said first direction.

6. The support assembly of claim 1, wherein each bearing is movable in a second direction in response to extension of the respective hydraulic actuator.

7. The support assembly as claimed in claim 1, wherein each hydraulic actuator includes a hydraulic fluid chamber that provides part of said reservoir.

8. The support assembly of claim 1, wherein each of said hydraulic actuators is a single-acting hydraulic actuator.

9. The support assembly of claim 1, wherein each bearing is movable with respect to the reservoir in a first direction in response to application of an external load to impart a corresponding force to said hydraulic fluid, and in a second direction opposite said first direction in response to receiving force from said hydraulic fluid.

10. The support assembly of claim 9, wherein said first direction is towards said reservoir and said second direction is away from said reservoir.

11. The support assembly of claim 1, wherein each bearing is supported by a respective part of the reservoir, the respective parts being hydraulically connected by the reservoir in order to transmit force, and therefore distribute load, amongst the bearings.

12. The support assembly as claimed in claim 1, wherein said at least two bearings comprise at least two bearings spaced apart in a first direction, and optionally at least two bearings spaced apart in a second direction perpendicular to said first direction.

13. The support assembly as claimed in claim 1, wherein said at least two bearings are rotatable bearings, for example a roller or wheel.

14. A telescopic assembly comprising a base structure, a second structure telescopically coupled to said base structure, and at least one support assembly as claimed in claim 1 supporting said second structure with respect to said base structure.

15. The assembly of claim 14, wherein said at least one support assembly is located between said base structure and said second structure.

16. The assembly of claim 14, wherein at least one of said at least one support assembly is located beneath said second structure to support said second structure on said base structure, or is located above said second structure.

17. The assembly of claim 14, wherein said at least one support assembly comprises a plurality of said support assemblies spaced apart in a direction of telescopic extension.

18. The assembly of claim 14, wherein said telescopic assembly is a telescopic conveyor.

19. The support assembly of claim 1, wherein an accumulator is connected to said hydraulic circuit for maintaining hydraulic pressure in said hydraulic circuit.

20. The support assembly of claim 19, wherein a pump is connected to the hydraulic circuit and is operable to charge the hydraulic circuit via the accumulator with hydraulic fluid from a tank, and wherein a sensor is provided for monitoring hydraulic pressure in the hydraulic circuit, wherein, in response to the sensor detecting an actionable decrease in fluid pressure, the pump operates to supply hydraulic fluid to the accumulator from the tank to re-charge the accumulator in order to re-establish a desired hydraulic pressure in the circuit.

21. A telescopic assembly comprising a base structure, a second structure telescopically coupled to said base structure, and at least one support assembly supporting said second structure with respect to said base structure, wherein said at least one support assembly comprises:

at least two spaced apart bearings and a reservoir of hydraulic fluid, the bearings being coupled to the reservoir to impart force to and receive force from the hydraulic fluid, the reservoir being configured to transmit force received from any one of said bearings to at least one other of said bearings by said hydraulic fluid, wherein each bearing is coupled to the reservoir by a respective hydraulic actuator, wherein the reservoir comprises a hydraulic circuit interconnecting the respective hydraulic actuator of each bearing with the respective hydraulic actuator of the, or each, other bearing such that hydraulic fluid can flow freely between the actuators to distribute load amongst the bearings, and wherein an accumulator is connected to said hydraulic circuit for maintaining hydraulic pressure in said hydraulic circuit.

22. The telescopic assembly of claim 21, wherein a pump is connected to the hydraulic circuit and is operable to charge the hydraulic circuit via the accumulator with hydraulic fluid from a tank, and wherein a sensor is provided for monitoring hydraulic pressure in the hydraulic circuit, wherein, in response to the sensor detecting an actionable decrease in fluid pressure, the pump operates to supply hydraulic fluid to the accumulator from the tank to re-charge the accumulator in order to re-establish a desired hydraulic pressure in the circuit.

* * * * *